(12) United States Patent
Walker et al.

(10) Patent No.: US 10,063,391 B2
(45) Date of Patent: Aug. 28, 2018

(54) SUBSCRIBER STATION FOR A BUS SYSTEM AND METHOD FOR IMPROVING THE QUALITY OF RECEPTION IN A BUS SYSTEM

(71) Applicant: Robert Bosch GmbH, Stuttgart (DE)

(72) Inventors: Steffen Walker, Reutlingen (DE); Bernd Hilgenberg, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/032,292

(22) PCT Filed: Oct. 20, 2014

(86) PCT No.: PCT/EP2014/072412
§ 371 (c)(1),
(2) Date: Apr. 26, 2016

(87) PCT Pub. No.: WO2015/067458
PCT Pub. Date: May 14, 2015

(65) Prior Publication Data
US 2016/0254926 A1    Sep. 1, 2016

(30) Foreign Application Priority Data

Nov. 8, 2013   (DE) .................. 10 2013 222 790

(51) Int. Cl.
*H04L 12/413*    (2006.01)
*H04L 25/02*    (2006.01)
(Continued)

(52) U.S. Cl.
CPC .......... *H04L 12/4135* (2013.01); *H04B 1/16* (2013.01); *H04L 25/029* (2013.01);
(Continued)

(58) Field of Classification Search
CPC ... H04B 1/16; H04L 12/4135; H04L 25/0286; H04L 25/029; H04L 25/061; H04L 2012/40215
See application file for complete search history.

(56) References Cited

U.S. PATENT DOCUMENTS 4,888,764 A     12/1989  Haug
2009/0279635 A1*  11/2009  Kinnaird ............. H04L 25/0274
                                                        375/287
(Continued)

FOREIGN PATENT DOCUMENTS

WO    WO2012/084696    6/2012

OTHER PUBLICATIONS

"CAN with Flexible Data Rate, Specification Version 1.0", http://www.semiconductors.bosch.de, Apr. 17, 2012.

*Primary Examiner* — Freshteh N Aghdam
(74) *Attorney, Agent, or Firm* — Norton Rose Fulbright US LLP; Gerard Messina (57) ABSTRACT

A subscriber station for a bus system and a method for improving the reception quality in the bus system are provided. The subscriber station includes an acquisition device for acquiring a bus state of a bus of the bus system, and a symmetrization device for the symmetrization, on the basis of the result of the acquisition device, of the bit durations and/or of the delay time durations of the rising and falling edge of a bit of signals received from the bus.

8 Claims, 6 Drawing Sheets

(51) Int. Cl.
    *H04L 25/06*     (2006.01)
    *H04B 1/16*     (2006.01)
    *H04L 12/40*     (2006.01)

(52) U.S. Cl.
    CPC ........ *H04L 25/0286* (2013.01); *H04L 25/061* (2013.01); *H04L 2012/40215* (2013.01)

(56) References Cited

U.S. PATENT DOCUMENTS

| | | | | |
|---|---|---|---|---|
| 2014/0157035 A1* | 6/2014 | Vowe | .................... | G06F 13/382 |
| | | | | 713/401 |
| 2014/0298133 A1* | 10/2014 | Hartwich | ............ | G06F 13/4295 |
| | | | | 714/758 |

* cited by examiner

SUBSCRIBER STATION FOR A BUS SYSTEM AND METHOD FOR IMPROVING THE QUALITY OF RECEPTION IN A BUS SYSTEM

FIELD

The present invention relates to a subscriber station for a bus system and to a method for improving the reception quality in a bus system.

BACKGROUND INFORMATION

The CAN bus system is used in the networking of devices for communication, for example in a vehicle, and is very well-suited for many other communication applications due to its parallel topology. In the CAN bus system, messages are transmitted using the CAN protocol, as described in the CAN specification in ISO 11898.

Recently, for this purpose in addition technologies have been proposed such as CAN-FD, with which messages can be transmitted in accordance with the specification "CAN with Flexible Data Rate, Specification Version 1.0," (source: http://www.semiconductors.bosch.de), etc. In such technologies, the maximum possible data rate is increased beyond the value of 1 Mbit/s through the use of a higher clock rate in the region of the data fields. Due to the constantly increasing volume of data in the bus system, through the introduction of CAN-FD the migration of existing control devices and vehicle platforms to higher data rates is enabled.

In the transmission of the signals on the bus system, depending on the data to be transmitted switching takes place between a high and a low signal state, or vice versa, the high signal state also being designated the dominant state and the low signal state also being designated the recessive state. Here, a signal transmitted on the bus, the bus signal, is delayed relative to a transmit signal of a subscriber station of the bus system. In addition, at a further subscriber station of the bus system a receive signal is delayed relative to the bus signal that results due to the transmit signal.

If, for example, the transmit signal is switched from the dominant state to the recessive state, then the signal at the bus requires a delay time t11 that can also be designated t_Neg_Transmitter, in order also to switch over from the dominant state to the recessive state. Likewise, the receive signal requires, after the switching over of the signal at the bus, a time t12 that can also be designated t_Neg_Receiver, in order likewise to switch over from the dominant state to the recessive state. If the transmit signal is again switched from the recessive state to the dominant state, then the signal at the bus requires a time t13 that can also be designated t_Pos_Transmitter, in order likewise to switch over from the recessive state to dominant state. Likewise, after switching over of the bus signal the receive signal requires a time t14, which can also be designated t_Pos_Receiver, also in order to switch again from the recessive state to the dominant state.

Ideally, in the example described above t_Pos=t_Neg, such that
t_Pos=t_Pos_Transmitter+t_Pos_Receiver, and
t_Neg=t_Neg_Transmitter+t_Neg_Receiver.

However, it is problematic that as the bit rate increases, thus, for example, in the transition from CAN to CAN-FD, this ideal is increasingly departed from. A consequence of this is that the bit symmetry required for the signal is not maintained, resulting in errored transmissions in the bus system.

SUMMARY

It is an object of the present invention to provide a subscriber station for a bus system and a method for improving the reception quality in a bus system that solve the problems named above. In particular, a subscriber station is provided for a bus system, and a method is to be provided for improving the reception quality in a bus system, in which the demands on the bit symmetry of a signal received in the bus system are met, so that no errored transmissions take place.

The object may be achieved by a subscriber station for a bus system in accordance with an example embodiment of the present invention. The example subscriber station may include an acquisition device for acquiring a bus state of a bus of the bus system, and a symmetrization device for symmetrization, on the basis of the results from the determination device, of the bit durations and/or the delay time durations of the rising and falling edge of a bit of signals received from the bus.

With the subscriber station, a better bit symmetry is possible in CAN_H and CAN_L of the bus system. In this way, errored transmissions between subscriber stations of the bus system are prevented.

In the subscriber station, the bus state can be a bit rate of a signal transmitted on the bus, and/or a recessive or dominant state of the bus and/or a high-frequency interference signal and/or a voltage value of a digital signal on the bus, which voltage value is above a specified value.

In the subscriber station, the acquisition device is possibly a first acquisition device for acquiring a digital signal on a bus of the bus system when a voltage value of the signal is above a first specified value, the subscriber station additionally including a second acquisition device for acquiring the digital signal on the bus of the bus system when the voltage value of the signal is above a second specified value, the second specified value being greater than the first specified value, and a determining device for determining a difference voltage between a dominant state and the recessive state of the digital signal on the bus on the basis of the acquisition results of the first and second acquisition device, and the symmetrization device being fashioned for the symmetrization of the bit durations of the signal received from the bus on the basis of the results from the determining device.

For example, the symmetrization device can be fashioned for the post-processing of the bit durations based on the result from the determining device, and at least one further acquisition device, and/or a post-processing device can be fashioned for the digital post-processing of the receive signal.

In addition or alternatively, it is possible for the symmetrization device to be fashioned for the adaptation of at least one input filter at the receive comparator of the subscriber station on the basis of the result of the acquisition device or of the determining device.

The symmetrization device can also be fashioned for the adaptation of the at least one input filter through end-of-line programming or adaptively during operation of the subscriber station.

It is also possible for the symmetrization device to be fashioned for the adaptation of input filters at the receive comparator of the subscriber station through changing over the input filters.

In the subscriber station, the symmetrization device can also be fashioned for the adaptation of at least one input filter at the receive comparator of the subscriber station through regulation of the recognition threshold of the at least one input filter.

The subscriber station described above can be part of a bus system that has a bus and at least two subscriber stations that are connected to one another via the bus in such a way that they can communicate with one another, at least one of the at least two subscriber stations being one of the subscriber stations described above.

In addition, the object described above may be achieved by a method for improving the reception quality in a bus system as recited in accordance with an example embodiment of the present invention. The method may include, of example, the steps: acquisition, using a first acquisition device, of a bus state of a bus of the bus system, and symmetrization, using a symmetrization device on the basis of a result of an acquisition using the acquisition device, of the bit durations or the delay time durations of the rising and falling edge of a bit of signals received from the bus.

The method offers the same advantages named above in relation to the subscriber station.

Further possible implementations of the present invention also include combinations not explicitly named of features or specific embodiments described above or in the following with regard to the exemplary embodiments. Here, a person skilled in the art will also add individual aspects, as improvements or supplements, to the respective basic form of the present invention.

BRIEF DESCRIPTION OF THE DRAWINGS

Below, the present invention is described in more detail with reference to the figures and on the basis of exemplary embodiments.

In the Figures, identical or functionally identical elements have been provided with the same reference characters, unless otherwise indicated.

DETAILED DESCRIPTION OF EXAMPLE EMBODIMENTS

Figure 1:
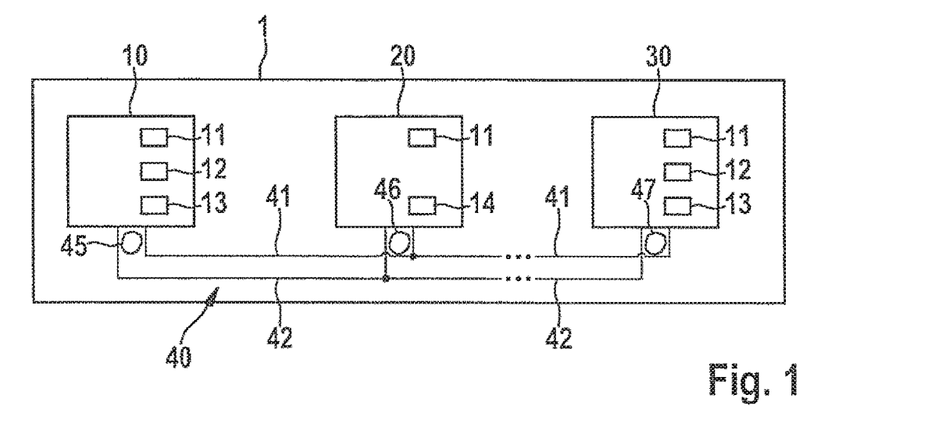
FIG. 1 shows a simplified block diagram of a bus system according to a first exemplary embodiment.

FIG. 1 shows a bus system 1 that can be for example a CAN bus system, a CAN-FD bus system, etc. Bus system 1 can be used in a vehicle, in particular a motor vehicle, an airplane, etc., or in a hospital, etc.

In FIG. 1, bus system 1 has a multiplicity of subscriber stations 10, 20, 30, each connected to a bus 40 with a first bus lead 41 and a second bus lead 42. Bus leads 41, 42 can also be named CAN_H and CAN_L, and are used to couple in the dominant level in the transmit state. Via bus 40, messages 45, 46, 47 can be transmitted in the form of signals between the individual subscriber stations 10, 20, 30. Subscriber stations 10, 20, 30 can for example be control devices or display devices of a motor vehicle.

As shown in FIG. 1, subscriber stations 10, 30 each have a communication control device 11, a transmit device 12, and a receive device 13. In contrast, subscriber station 20 has a communication control device 11 and a transceiver device 14. Transmit devices 12, receive devices 13 of subscriber stations 10, 30, and transceiver device 14 of subscriber stations 20 are each connected directly to bus 40, even though this is not shown in FIG. 1.

Communication control device 11 is used to control a communication of the respective subscriber station 10, 20, 30, via bus 40, with another subscriber station of subscriber stations 10, 20, 30 connected to bus 40. Communication control device 11 can be realized as a conventional CAN controller.

Transmit device 12 is used to send messages 45, 47, in the form of signals, to another subscriber station of bus system 1. With regard to its transmit functionality, transmit device 12 can be realized as a conventional CAN transceiver.

Receive device 13 is described in more detail below.

Transceiver device 14 can be realized as a conventional CAN transceiver.

Figure 2:
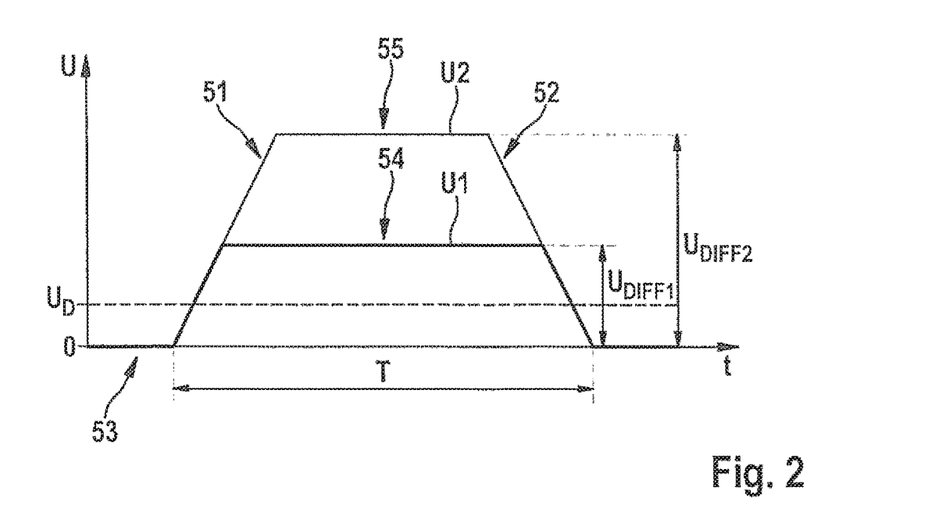
FIG. 2 shows voltage curves of two bus signals over time in the bus system according to the first exemplary embodiment.

FIG. 2 shows an example of a part of a voltage curve U1, U2 of a first and second bus signal over time t, as the bus signals are transmitted after transmission of a signal from transmit device 12 on bus 40. The first and second bus signal can also be designated first and second signal on bus 40. The signal from transmit device 12 can also be designated transmit signal.

FIG. 2 shows only one bit of the two bus signals illustrated as an example. The bit has time duration, or bit duration, T, and has switching edges 51, 52, at which the bit changes from its low signal state to its high signal state and back, or from its recessive state 53 to its respective dominant state 54, 55, and back. In addition, the first bus signal in FIG. 2 has a lower difference voltage $U_{DIFF1}$ between its dominant state 54 and its recessive state 53 than does the second bus signal, which has a difference voltage $U_{DIFF2}$ between its dominant state 55 and its recessive state 53. Receive device 13 has a receive threshold $U_D$ above which receive device 13 can acquire the bus signal. In a conventional CAN transceiver, receive threshold $U_D$ is approximately 0.7 V, as shown in FIG. 2. Accordingly, in this example difference voltage $U_{DIFF1}$ is approximately 1.5 V, and difference voltage $U_{DIFF2}$ is approximately 3.0 V. However, other voltage values are also possible.

Figure 3:
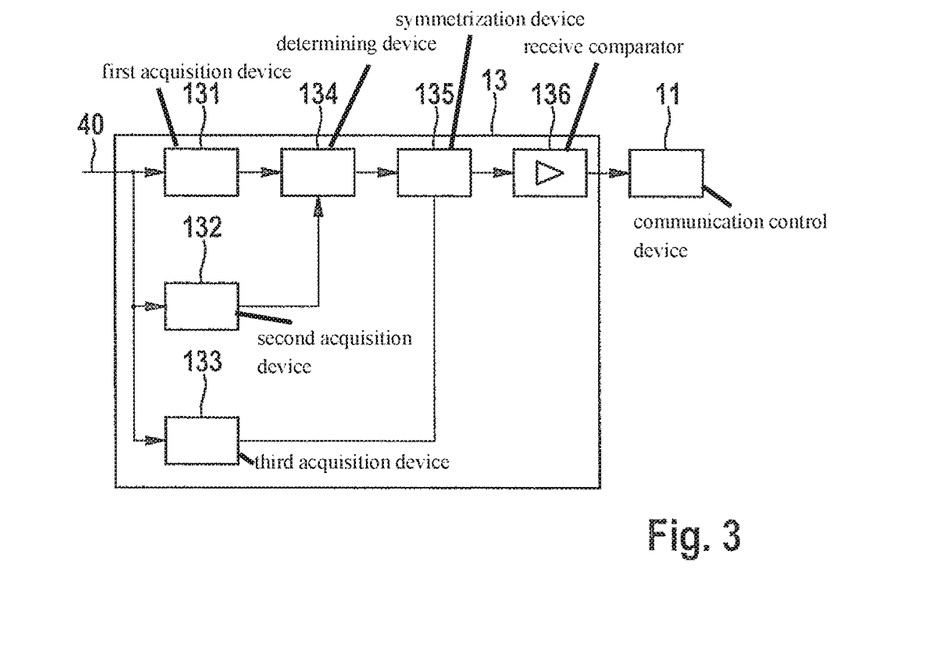
FIG. 3 shows a simplified block diagram of a receive device of the bus system according to the first exemplary embodiment.

FIG. 3 shows in more detail the design of receive device 13, which is connected at its one side to bus 40 and at its other side to communication control device 11. Accordingly, receive device 13 includes a first acquisition device 131, a second acquisition device 132, a third acquisition device 133, a determining device 134, a symmetrization device 135, and a receive comparator 136.

Figure 4:
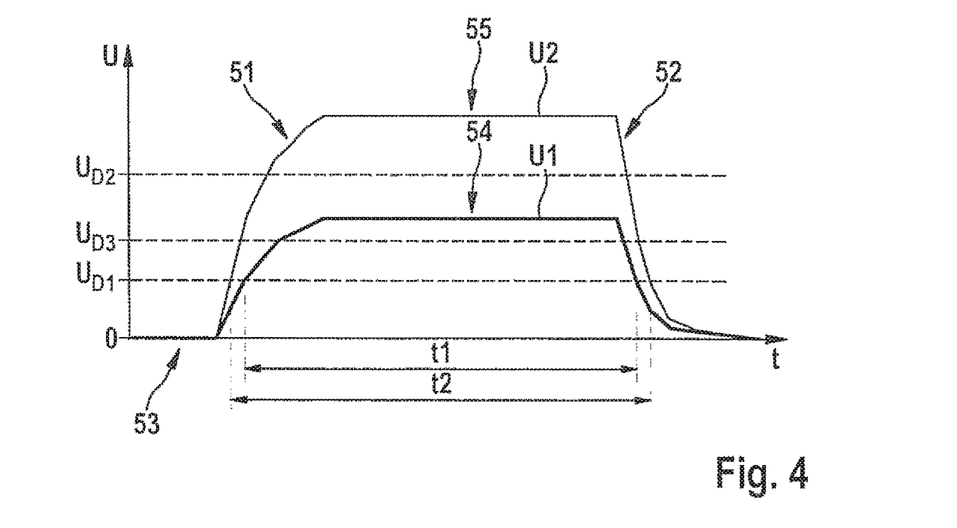
FIG. 4 shows voltage curves of two receive signals over time in a subscriber station of the bus system before a bit symmetrization measure according to the first exemplary embodiment.
Figure 5:
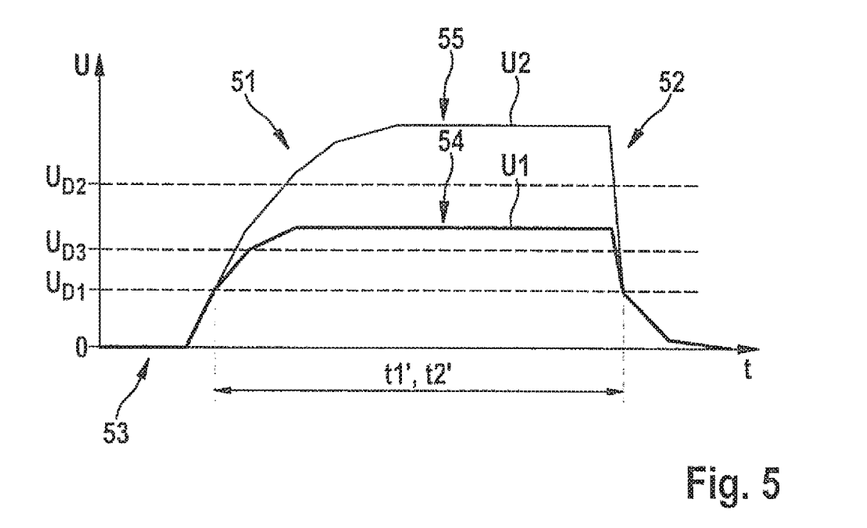
FIG. 5 shows voltage curves of two receive signals over time in a subscriber station of the bus system after a bit symmetrization measure according to the first exemplary embodiment.

If signals are transmitted via bus 40, as shown in FIG. 2, acquisition device 13 receives, at its input at acquisition devices 131, 132, 133, signals from bus 40 having a bit shape as shown in FIG. 4. In contrast, receive comparator 136 receives from symmetrization device 135 signals having a bit shape as shown in FIG. 5. Relative to the signals in FIG. 4, the signals in FIG. 5 are symmetrized with regard to their bit duration t1, t2, as described below.

In FIG. 3, the bus signal currently transmitted on bus 40 is supplied to each of first through third acquisition devices 131, 132, 133. The bus signal can be one of the bus signals shown in FIG. 2. First acquisition device 131 has a voltage value of the bus signal not equal to zero if the bus signal is above a first specified value, which for example can be equal to voltage $U_{D1}$ shown in FIG. 4 and FIG. 5. Second acquisition device 132 acquires a voltage value of the bus signal not equal to zero if the bus signal is above a second specified value, which for example can be equal to voltage $U_{D2}$ also shown in FIG. 4 and FIG. 5. Here the second specified value is greater than the first specified value. Third acquisition device 132 acquires a voltage value of the bus signal not equal to zero when the bus signal is above a third specified value, which for example can be equal to voltage $U_{D3}$, also shown in FIG. 4 and FIG. 5. Here, the third specified value is smaller than the second specified value but is larger than the first specified value, as can also be seen in FIG. 4 and FIG. 5.

As is shown in FIG. 3, the acquisition results of first and second acquisition device 131, 132 are supplied to determining device 134 which, depending on the present case, determines first or second difference voltage $U_{DIFF1}$, $U_{DIFF2}$. Determining device 134 supplies the result of its determination to symmetrization device 135, which is used for the symmetrization of bit durations t1, t2 of the receive signal. Here, symmetrization device 135 uses the result of the determination of determination device 134.

In the present exemplary embodiment, for the symmetrization of bit durations t1, t2 of the receive signal of FIG. 4, symmetrization device 135 carries out a post-processing of bit durations t1, t2 on the basis of the result of determining device 134. Here symmetrization device 135 additionally uses an acquisition result of third acquisition device 133. In addition, further acquisition devices may also be present whose acquisition thresholds can be between or greater than the values $U_{D1}$ and $U_{D2}$. In the post-processing, switching edges 51, 52 of the receive signal of FIG. 4 are modified in such a way that the bit durations are equal, and thus t1'=t2', as is shown in FIG. 5. In this way, receive comparator 136 can reliably evaluate the information contained in the bits of the signal. In this way, receive device 13 can reliably receive the bus signal independent of the difference voltage $U_{DIFF1}$ or $U_{DIFF2}$. As a result, transmission errors can be avoided even at a high bitrate, such as for example given the use of CAN-FD.

Figure 6:
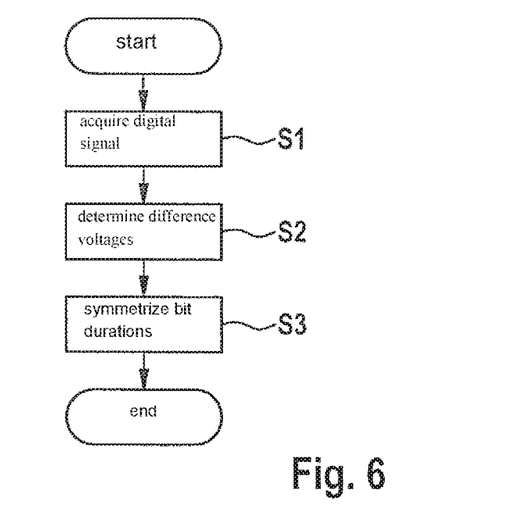
FIG. 6 shows a flow diagram of a method for improving the reception quality in a bus system according to the first exemplary embodiment.

Thus, with receive device 13 a method is carried out for improving the reception quality in bus system 1, as illustrated in FIG. 6.

Here, after the beginning of the method at a step S1, the digital signal on bus 40 is acquired using first acquisition device 131 if a voltage value of the bus signal is above the first specified value. In addition, with second acquisition device 132 the digital signal on bus 40 is acquired if a voltage value of the bus signal is above the second specified value, as described above with reference to FIGS. 3 through 5. After this, the flow continues to a step S2.

At step S2, receive device 13, or more precisely its determining device 134, determines first difference voltage $U_{DIFF1}$ between the low and the high value, or the states 53, 54, 55, of the digital signal on bus 40, the bus signal, or second difference voltage $U_{DIFF2}$. More precisely, determining device 134 determines first difference voltage $U_{DIFF1}$ and second difference voltage $U_{DIFF2}$, each during the dominant phase of the signal, i.e., if the signal in FIG. 2 and in FIG. 4 has changed from recessive state 53 to dominant state 54 or 55 and back. Subsequently, the flow continues to a step S3.

In step S3, symmetrization device 135 symmetrizes bit durations t1, t2 of the receive signal of FIG. 4 on the basis of the result of the determination of determining device 134 in step S2, and outputs the signal with symmetrized bit durations t1', t2' to a communication control device 11. After this, the method is terminated.

According to a second exemplary embodiment, symmetrization device 135 is fashioned for the adaptation of input filters at the input of receive comparator 136 of subscriber stations 10, 30 on the basis of the result of determining device 134. In this exemplary embodiment, the bus system is largely realized as described above in relation to the first exemplary embodiment. Differing from the first exemplary embodiment, however, in the present exemplary embodiment subscriber stations 10, 30 have, instead of receive device 13, a receive device 130 whose design is shown in FIG. 7.

Figure 7:
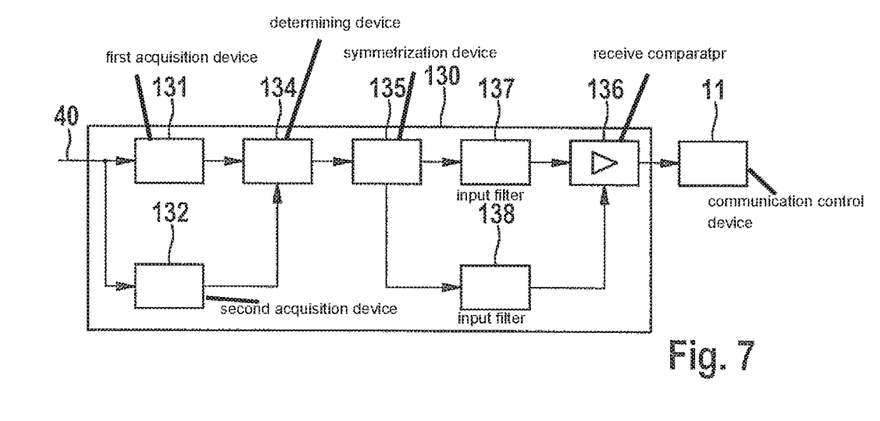
FIG. 7 shows a simplified block diagram of a receive device of the bus system according to a second exemplary embodiment.

In FIG. 7, receive device 130 according to the present exemplary embodiment again has first acquisition device 131, second acquisition device 132, determining device 134, symmetrization device 135, and receive comparator 136, but does not have third acquisition device 133. Another difference from the first exemplary embodiment is that receive device 130 according to the present exemplary embodiment has a first and a second input filter 137, 138 situated at the input of receive comparator 136. It is also possible for more than the two input filters 137, 138 to be present at the input of receive comparator 136.

In the present exemplary embodiment, symmetrization device 135 symmetrizes bit durations t1, t2 of the receive signals in FIG. 4, in that, in step S3, it changes over input filters 137, 138 as a function of the bus state or level at bus 40, i.e. low or high signal state, or recessive state or dominant state 53, 54, 55 (FIG. 2) of the bus signal. Accordingly, symmetrization device 135 forwards the receive signal according to FIG. 4, on the basis of the determination result of determining device 134 and of the respectively present bus state, either to first input filter 137 or to second input filter 138.

In this way, receive device 130 can reliably receive the bus signal independent of difference voltage $U_{DIFF1}$ or $U_{DIFF2}$. As a consequence, in the present exemplary embodiment as well, transmission errors can be avoided even at a high bit rate, such as for example in the case of CAN-FD.

Figure 8:
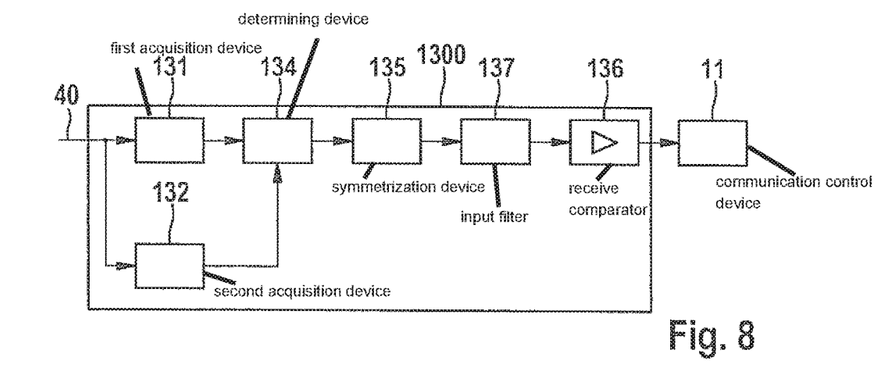
FIG. 8 shows a simplified block diagram of a receive device of the bus system according to a third exemplary embodiment.

According to a third exemplary embodiment, in a receive device 1300 it is also possible for only one input filter 137 to be present that is realized so as to be capable of being regulated, as shown in FIG. 8. Thus, symmetrization device 135 adapts input filter 137 at the input of receive comparator 136 of subscriber stations 10, 30 on the basis of the result of determining device 134 through regulation of its pass threshold or recognition threshold, on the basis of bit durations t1, t2 in FIG. 4. In other respects, receive device 1300 in FIG. 8 has the same construction as receive device 130 of FIG. 7.

Figure 9:
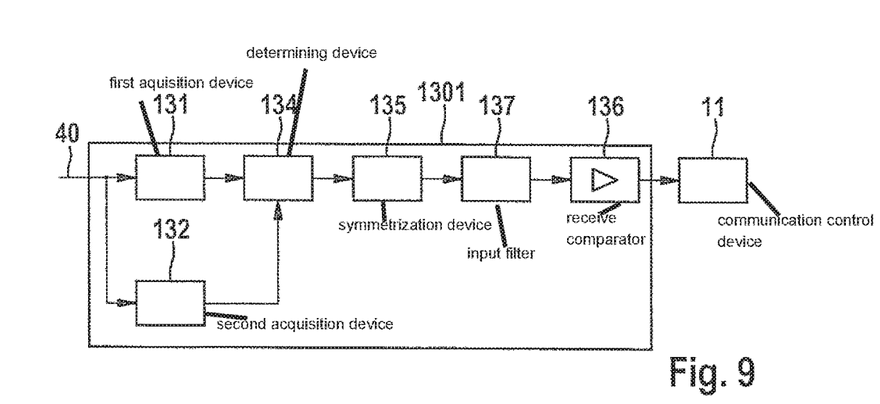
FIG. 9 shows a simplified block diagram of a receive device of the bus system according to a fourth exemplary embodiment.
Figure 10:
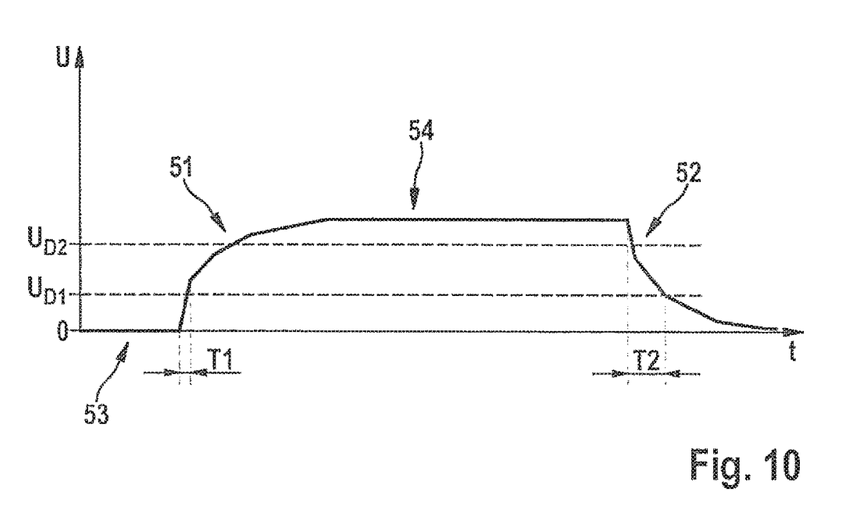
FIG. 10 shows a voltage curve of a receive signal over time in a subscriber station of the bus system before a bit symmetrization measure according to the fourth exemplary embodiment.
Figure 11:
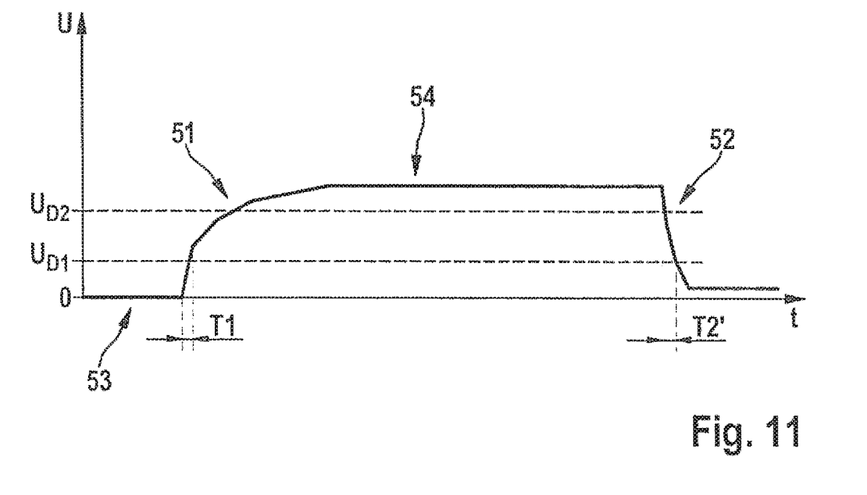
FIG. 11 shows a voltage curve of a receive signal over time in a subscriber station of the bus system after a bit symmetrization measure according to the fourth exemplary embodiment.

FIG. 9 shows a receive device 1301 according to a fourth exemplary embodiment, realized in a manner very similar to receive device 1300 according to the third exemplary embodiment. Receive device 1301 according to the present exemplary embodiment also includes only one input filter 137, realized so as to be capable of being regulated with regard to its limit frequency. Here, acquisition devices 131, 132 determine the bus state at bus 40, namely whether a dominant state 54, 55 or a recessive state 53 is present. Depending on the acquired state, symmetrization device 135 symmetrizes time duration T1 of a delay time at the rising edge 51 and time duration T2 of a delay time at the falling edge 52 from the state in FIG. 10 to the state in FIG. 11. In the case of the recessive state, symmetrization device 135 adapts the limit frequency of input filter 137 at the input of receive comparator 136 of subscriber stations 10, 30 in such a way that the limit frequency of input filter 137 is lower than in the case in which a dominant state is present. In this way, a receive signal according to FIG. 10, in which a time duration T1 of a delay time at rising edge 51 is smaller than a time duration T2 of a delay time at falling edge 52, is modified to form a signal according to FIG. 11. In the modified receive signal in FIG. 11, time duration T1 of the delay time at rising edge 51 of the modified receive signal is equal to a time duration T2' of a delay time at falling edge 52 of the modified receive signal.

Accordingly, symmetrization device 135, in the present exemplary embodiment as well, adapts input filter 137 at the input of receive comparator 136 of subscriber stations 10, 30 on the basis of the result of determining device 134 through regulation of its limit frequency, on the basis of the bus state. In other respects, receive device 1301 in FIG. 9 has the same construction as receive device 1300 of FIG. 8.

According to a modification of the fourth exemplary embodiment, receive device 1301 includes only first acquisition device 131 or second acquisition device 132. In this case, determining device 134 can also be omitted, so that symmetrization device 135 adapts input filter 137 at the input of receive comparator 136 of subscriber stations 10, 30 on the basis of the result of the first or second acquisition device 131, 132, through regulation of its limit frequency, on the basis of the bus state.

Figure 12:
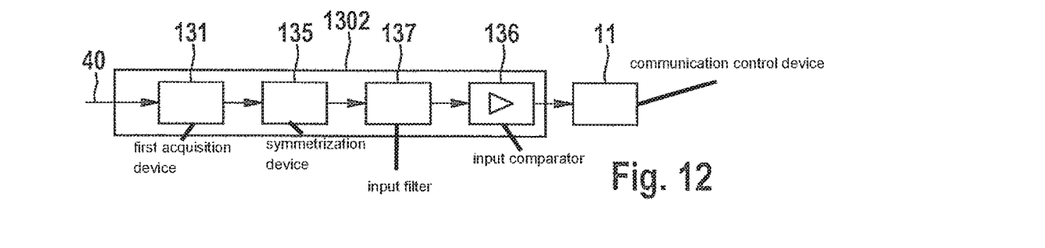
FIG. 12 shows a simplified block diagram of a receive device of the bus system according to a fifth exemplary embodiment.

FIG. 12 shows a receive device 1302 according to a fifth exemplary embodiment. According to the fifth exemplary embodiment, symmetrization device 135 increases the bandwidth of input filter 137 when bus system 1 is in an operating mode in which data are transmitted with a bit rate greater than 1 Mbit/s, such as for example during CAN-FD operation. Accordingly, acquisition device 131 can acquire whether data are being transmitted on bus 40 with a bit rate greater than 1 Mbit/s. Depending on the application, given the presence of the operating mode in which data are transmitted with a bit rate greater than 1 Mbit/s input filter 137 of input comparator 136 can be adapted via an end-of-line programming of its pass frequency band. The adaptation of the input filter 137 can however also take place adaptively during operation. In the present exemplary embodiment, second acquisition device 132 and/or determining device 134 can also be present.

Figure 13:
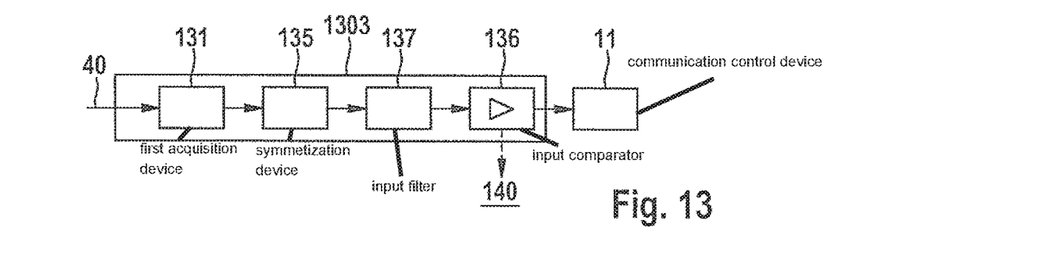
FIG. 13 shows a simplified block diagram of a receive device of the bus system according to a sixth exemplary embodiment.

FIG. 13 shows a receive device 1303 according to a sixth exemplary embodiment. According to the sixth exemplary embodiment, symmetrization device 135 reduces a bandwidth of input filter 137 if a high-frequency interference radiation 140 is acquired, for example by a high-frequency detector as acquisition device 131. Accordingly, first acquisition device 131 can acquire the occurrence of a high-frequency interference radiation 140 on the basis of which a data transmission in bus system 1 is disturbed or could be disturbed. High-frequency interference radiation is understood as signals having frequencies in a range from approximately 500 kHz to approximately 10 GHz, in particular in a range from approximately 900 kHz to approximately 3 GHz. Particularly preferably, high-frequency interference radiation is understood as signals having frequencies in a range from approximately 1 MHz to approximately 1 GHz.

In the present exemplary embodiment as well, depending on the application, when a high-frequency interference radiation 140 occurs, input filter 137 can be adapted via an end-of-line programming. In this way, the high-frequency interference radiation 140 can be filtered out from the receive signal, as is illustrated in FIG. 13. However, the adaptation of input filter 137 can also take place adaptively during operation. In the present exemplary embodiment as well, second acquisition device 132 and/or determining device 134 can also be present.

Figure 14:
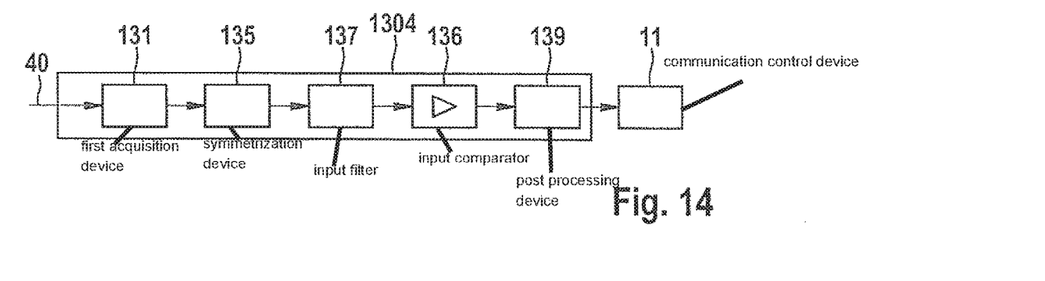
FIG. 14 shows a simplified block diagram of a receive device of the bus system according to a seventh exemplary embodiment.

FIG. 14 shows a receive device 1304 according to a seventh exemplary embodiment. According to the seventh exemplary embodiment, after receive comparator 136 there is connected a post-processing device 139 of receive device 1304 that digitally post-processes the digital signal outputted from receive comparator 136. In this way, the reception quality of receive device 1304 can be further increased at low cost. A more expensive analog post-processing of the signal received from bus 40, before receive comparator 136, can be omitted. In the post-processing, information from further thresholds can also be used, which can be acquired for example using acquisition devices 132 and 133 according to the first or the second through fourth exemplary embodiment.

Thus, in the exemplary embodiments described above and their modifications, first acquisition device 131 and/or second acquisition device 132 are used to acquire a bus state of bus 40 of bus system 1. Here, the bus state in the first through fourth exemplary embodiments is a voltage value of a digital signal on bus 40, which voltage value is above a specified value. In the third and fourth exemplary embodiment, the bus state is in particular a dominant or recessive state 53, 54, 55 of bus 40. In addition, the bus state in the fifth exemplary embodiment is a bit rate of a signal transmitted on bus 40. In addition, in the sixth exemplary embodiment the bus state is a high-frequency interference signal. The bus state in the seventh exemplary embodiment can be one of the bus states as described in the first through sixth exemplary embodiment.

All embodiments described above of bus system 1, subscriber stations 10, 30, receive devices 13, 130, 1300, 1301, 1302, and of the method, can be used individually or in all possible combinations. In particular, any combination is possible of the features of the exemplary embodiments and/or the modifications thereof. In addition, in particular the following modifications are conceivable.

Bus system 1 according to the exemplary embodiments is in particular a CAN network or a CAN FD network or a FlexRay network.

The number and configuration of subscriber stations 10, 20, 30 in bus system 1 of the exemplary embodiments is arbitrary. In particular, it is also possible for only subscriber stations 10 or only subscriber stations 30 or only subscriber stations 10, 30 to be present in bus system 1 of the exemplary embodiments.

Subscriber stations 10, 30 described above and the method carried out by them can be used particularly advantageously with a modified data protocol, published on 2 May 2011 at the Internet page http://www.semiconductors.bosch.de in published document "CAN with Flexible Data Rate, White Paper, Version 1.0," and which enables, inter alia, an enlargement of the data field, as well as a shortening of the bit length for a part of the CAN message after arbitration has taken place.

Subscriber stations 10, 30 represent, in particular for CAN-FD, a possibility for increasing the transmission quality of CAN-FD in the range of standard CAN transmissions, using a significantly higher data rate.

The functionality of the exemplary embodiments described above can also be realized in a transceiver 13 or in a communication control device 11, etc. In addition or alternatively, transmit device 12 can be integrated into existing products.

What is claimed is:

1. A subscriber station for a bus system, comprising:
   a first acquisition device for acquiring a digital signal on a bus of the bus system if a voltage value of the signal is above a first specified value;
   a second acquisition device for acquiring the digital signal on the bus of the bus system when the voltage value of the signal is above a second specified value, the second specified value being greater than the first specified value;
   a determining device for determining a difference voltage between a dominant state and a recessive state of the digital signal on the bus on the basis of the acquisition results of the first and second acquisition devices; and
   a symmetrization device for symmetrization, on the basis of the result of the determining device, of at least one of: i) bit durations of bits of signals received from the bus, or ii) delay time durations of rising and falling edges of the bits of signals received from the bus.

2. The subscriber station as recited in claim 1, wherein at least one of: i) the symmetrization device is fashioned for post-processing of the bit durations on the basis of the result of the determining device and of at least one further acquisition device, or ii) a post-processing device is fashioned for the digital post-processing of the received signal.

3. The subscriber station as recited in claim 1, wherein the symmetrization device is fashioned for adaptation of at least one input filter at a receive comparator of the subscriber station on the basis of the result of one of the acquisition device or the determining device.

4. The subscriber station as recited in claim 3, wherein the symmetrization device is fashioned for adaptation of the at least one input filter one of: i) through end-of-line programming, or ii) adaptively during operation of the subscriber station.

5. A subscriber station for a bus system, comprising:
   an acquisition device for acquiring a bus state of a bus of the bus system; and
   a symmetrization device for symmetrization, on the basis of the result of the acquisition device, of at least one of:
   i) bit durations of bits of signals received from the bus, or ii) delay time durations of rising and falling edges of the bits of signals received from the bus;
   wherein the symmetrization device is fashioned for adaptation of input filters at a receive comparator of the subscriber station by changing over the input filters.

6. A subscriber station for a bus system, comprising:
   an acquisition device for acquiring a bus state of a bus of the bus system; and
   a symmetrization device for symmetrization, on the basis of the result of the acquisition device, of at least one of:
   i) bit durations of bits of signals received from the bus, or ii) delay time durations of rising and falling edges of the bits of signals received from the bus;
   wherein the symmetrization device is fashioned for adaptation of at least one input filter at a receive comparator of the subscriber station through regulation of a threshold of the at least one input filter.

7. A bus system, comprising:
   a bus; and
   at least two subscriber stations connected to one another via the bus in such a way that the subscriber stations can communicate with one another, wherein at least one of the at least two subscriber stations includes:
   a first acquisition device for acquiring a digital signal on the bus if a voltage value of the digital signal is above a first specified value;
   a second acquisition device for acquiring the digital signal on the bus when the voltage value of the digital signal is above a second specified value greater than the first specified value;
   a determining device for determining a difference voltage between a dominant state and a recessive state of the digital signal on the basis of the acquisition results of the first and second acquisition devices; and
   a symmetrization device for symmetrization, on the basis of the result of the acquisition device, of at least one of: i) bit durations of the digital signal, or ii) delay time durations of rising and falling edges of the digital signal.

8. A method for improving the reception quality in a bus system, comprising:
   acquiring, with a first acquisition device a digital signal on a bus of the bus system if a voltage value of the digital signal is above a first specified value;
   acquiring, with a second acquisition device the digital signal if the voltage value of the digital signal is above a second specified value greater than the first specified value;
   determining a difference voltage between a dominant state and a recessive state of the digital signal on the basis of the acquisition results of the first and second acquisition devices; and
   symmetrizing, with a symmetrization device, on the basis of a result of an acquisition with the acquisition device, at least one of: i) bit durations of the digital signal, or ii) delay time durations of rising and falling edges of the digital signal.

\* \* \* \* \*